United States Patent [19]

Chapel et al.

[11] Patent Number: 5,848,157

[45] Date of Patent: Dec. 8, 1998

[54] SYSTEM FOR THE SHIFTING OF A TELEVISION SIGNAL SCRAMBLER

[75] Inventors: Claude Chapel, Rennes; Philippe Lemonnier, Geveze, both of France

[73] Assignee: Thomson Broadcast Systems, Cergy Pontoise, France

[21] Appl. No.: 588,391

[22] Filed: Jan. 18, 1996

[30] Foreign Application Priority Data

Jan. 31, 1995 [FR] France ................................. 95 01099

[51] Int. Cl.$^6$ ...................................................... H04L 9/00
[52] U.S. Cl. ............................................................. 380/20
[58] Field of Search .................................. 380/19, 20, 10

[56] References Cited

U.S. PATENT DOCUMENTS

| | | | |
|---|---|---|---|
| 5,021,782 | 6/1991 | Perron et al. | 341/67 |
| 5,040,211 | 8/1991 | Schreiber | 380/10 |
| 5,138,659 | 8/1992 | Kelkar et al. | 380/20 |
| 5,193,002 | 3/1993 | Guichard et al. | 358/261.3 |
| 5,355,409 | 10/1994 | Hirashima | 380/19 |
| 5,426,699 | 6/1995 | Wunderlich et al. | 380/20 |
| 5,455,860 | 10/1995 | Hirashima | 380/19 |
| 5,535,275 | 7/1996 | Sugisaki et al. | 380/20 |
| 5,546,461 | 8/1996 | Ibaraki et al. | 380/20 |
| 5,606,612 | 2/1997 | Griffin et al. | 380/20 |

FOREIGN PATENT DOCUMENTS

| | | |
|---|---|---|
| 0 461 029 | 12/1991 | European Pat. Off. . |
| 0 489 929 | 6/1992 | European Pat. Off. . |
| 2 196 516 | 4/1988 | United Kingdom . |

OTHER PUBLICATIONS

S.R. Ely, et al., "Conditional Access Scrambling Techniques for Terrestrial UHF Television Broadcasts", International Broadcasting Convention, Sep. 23–27, 1988, (pp. 318–322).

Daniel M. Moloney, et al., "Digital Compression in Todays Addressable Environment", 42nd Annual Convention and Exposition of the National Cable Television Association, Jun. 6–9, 1993, (pp. 308–316).

*Primary Examiner*—Salvatore Cangialosi
*Attorney, Agent, or Firm*—Oblon, Spivak, McClelland, Maier & Neustadt, P.C.

[57] ABSTRACT

The shifting system comprises a local scrambler (13) on a production site giving the necessary digital data elements to a scrambler (15) shifted to a transmission site. These data elements are inserted, at the image rate, into the compressed television signal transmitted on a low bit rate link to the transmission site. The application relates to systems for the transmission of encrypted television systems.

14 Claims, 2 Drawing Sheets

SYSTEM FOR THE SHIFTING OF A TELEVISION SIGNAL SCRAMBLER

BACKGROUND OF THE INVENTION

1. Field of the Invention

The invention relates to a system for the shifting of a scrambler for the transmission of an encrypted television signal.

2. Description of the Prior Art

In a system of encrypted television, the constitution of the scrambled image is generally done by a site comprising at least:

the studio or studios of the final control center, the scrambler.

This is the production site.

The site at which the transmission goes out to subscribers, or transmission site, is generally a separate site. The point of transmission, whether the transmission is by RF, satellite, optical fibers or cables, is in fact often a site belonging to a telecom operator. The link between the production site and the transmission site which conveys digital data is generally set up by optical fiber, RF beams or coaxial cables. It is the encrypted signal that is transmitted on this link.

The methods currently used in image scrambling are known. They are, for example:

the "discrete" method which acts by the shifting of a line according to pseudo-randomly generated delays, line shuffling which consists in shuffling the lines within blocks of lines also pseudo-randomly, the "line cut and rotate" method which consists of the selection, pseudo-randomly, of a cut-off point on the line and the permutation of the segments thus defined.

The configuration of the overall scrambling and transmission device with scrambling at the production site, as known in the prior art, is shown in FIG. 1.

On the production site 1, the video source 2 gives the video analog signals to a scrambler 3. This scrambler is managed by a management system 4 which has the function, inter alia, of controlling the scrambler and of generating access checking messages generally transmitted in the video signal to the subscriber.

The video signal at output of the scrambler 3 goes into a CODec 5 which also receives information on sound coming from an audio source 6. The CODec transmits this multiplexed information on a video link by encoding it conventionally, namely by carrying out, for example, a PCM (pulse code modulation) encoding operation and by structuring this digital data, namely by adding the control signals and other synchronization words needed for this transmission. On the transmission side 7 and in line reception, a coDEC 8 carries out the decoding, which is the operation in reverse to the earlier encoding operation, corresponding to the restitution of the scrambled video analog signal and of the sound. These signals are finally broadcast through an antenna 9.

This device requires a high bit rate link between the video signal transmitter site and the receiver site. For, the scrambling destroys the spatial correlation (line-to-line) and temporal correlation (frame-to-frame) of the image. The redundancy in the information transmitted, due to the correlation, which is characteristic of video images, is usually exploited in the field of data compression by the transposition of the signals into the frequency domain, i.e. for example discrete cosine transformation, and/or by image prediction, namely for example motion estimation. Owing to the scrambling of this signal, this redundancy disappears and it is impossible to carry out any efficient compression of the signal to be transmitted. This very fact makes it necessary to have a high bit rate link. The data elements are thus conveyed in 140 Mbit/s type channels.

These links are very costly and one approach to this drawback, again according to the prior art, consists in shifting the scrambler away to the transmission site. The configuration is shown in where the same numbers are used for the identical elements.

On the production site 1, the video source 2 gives the video analog signals directly to a CODec 10 which also receives the sound signal coming from the audio source 6. The CODec has the role, complementary to the PCM encoding, of compressing the video digital data elements. It transmits the data elements on a low bit rate video-and-sound link, for example of the 8 Mbit/s type, to a coDEC 11 of the transmission site 7. This coDEC decompresses and decodes the digital data elements and then transmits the analog signal to a scrambler 3 which takes charge of the task of giving the scrambled video-and-sound signals to the antenna 9.

The management system 4 cannot be shifted to the transmission site. Indeed, owing to its strategic importance, i.e. the fact that the management system contains, among others, the circuits performing the algorithms for the encryption of the access checking data elements, it must be kept in the place in which the management of the subscribers and the management of the scrambling time slots is also carried out. Thus, an additional specialized, two-way link connects the management system 4 of the production site to the scrambler 3 of the transmission site.

However, while the security in the management system itself is thereby ensured, this is not so for the system as a whole since sensitive data flows on a specialized link. This link is public and may therefore be tapped. Other drawbacks arise out of the fact that it is necessary to have a link in addition to the video link and that the transmission of data on this specialized link may be interrupted or erroneous owing to disturbances in telephone lines.

The present invention is aimed at overcoming the above-mentioned drawbacks.

SUMMARY OF THE INVENTION

The invention relates to a system for shifting a scrambler of a television signal coming from an audio and video source on a production site, the scrambled signal being transmitted to the subscriber from a transmission site different from the production site, wherein a local scrambler on the production site receives the television signal to give digital data elements needed for the scrambling, an encoder carries out a digital and entropic encoding of the television signal, the digital data elements and the encoded television signal are transmitted to the transmission site and a scrambler shifted to the transmission site scrambles the decompressed television signal on the basis of the digital data elements received by the transmission site.

BRIEF DESCRIPTION OF THE DRAWINGS

The characteristics and advantages of the present invention shall appear more clearly from the following description, given by way of an example and made with reference to the appended figures, of which.

MORE DETAILED DESCRIPTION

The invention consists in shifting the scrambling circuits of a scrambler away from the production site to the transmission site and in keeping the processing circuits on the production site so as to obtain, on this site, the data elements needed by the scrambling circuits in order to insert them into the encoded and compressed television signal transmitted to the transmission site.

The invention thus enables the transmission of the video signal between the production site and the transmission site on a low bit rate link while at the same time preserving the confidentiality and security needed by the scrambling system.

Figure 1:
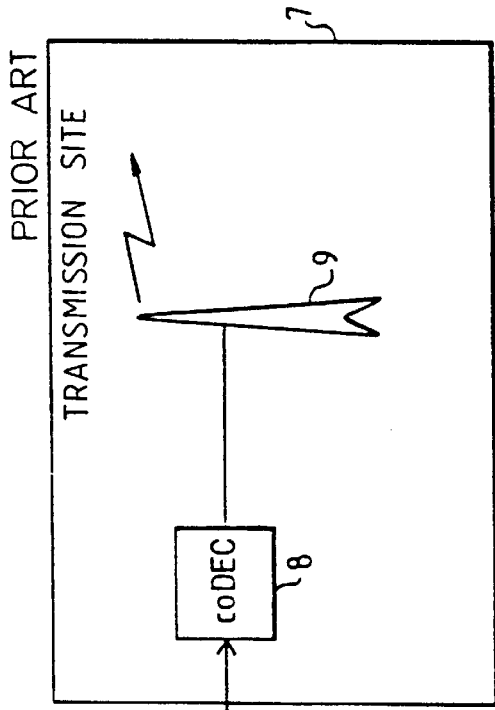
FIG. 1 shows a high bit rate link between a production site with a scrambler and a transmission site according to the prior art.
Figure 1:
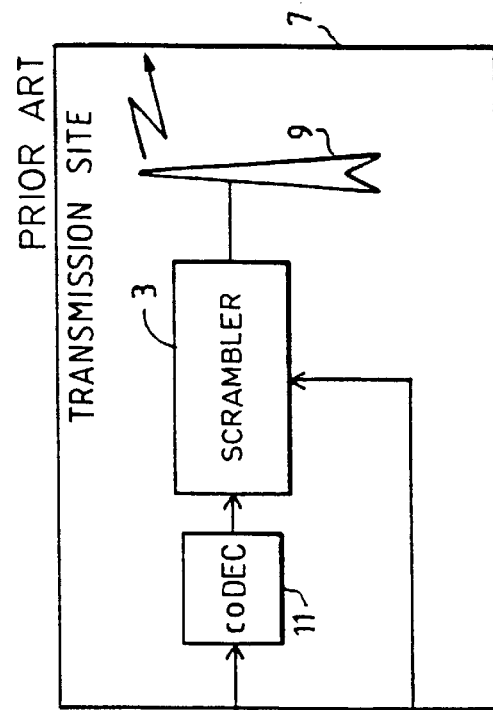
Figure 2:
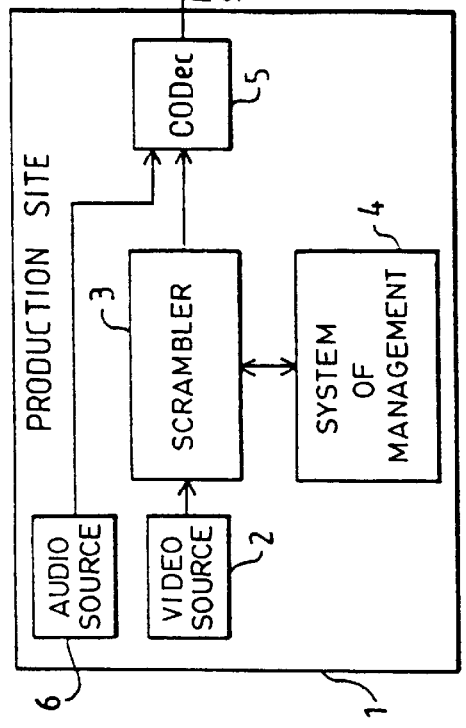
FIG. 2 shows a low bit rate link between a production site and a transmission site with a scrambler according to the prior art.
Figure 2:
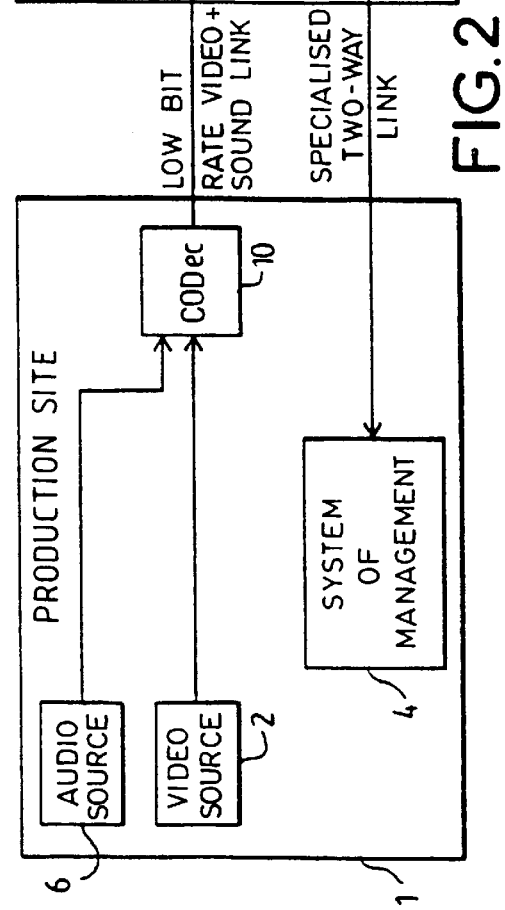
Figure 3:
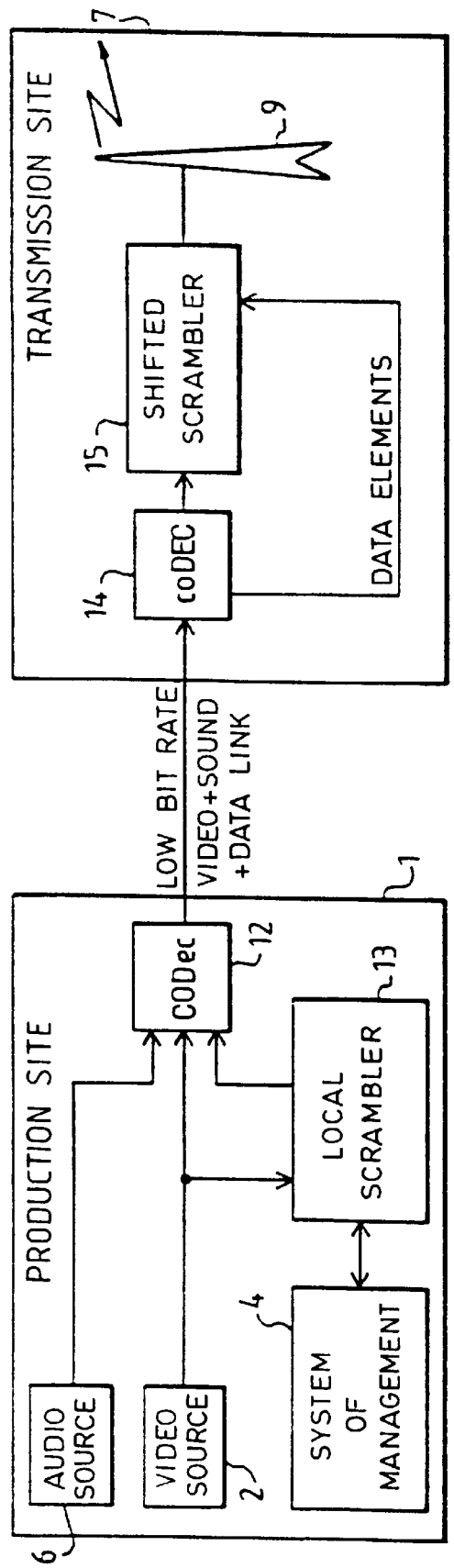
FIG. 3 shows a low bit rate link between a production site with a local scrambler and a transmission site with a shifted scrambler.

The configuration of the system according to the invention is shown in FIG. 3. The reference numbers of FIG. 1 are repeated for the identical elements.

The video source 2 on the production site 1 is distributed simultaneously to a low bit rate encoder or CODec 12 and a scrambler 13 which shall be called a local scrambler. This scrambler is, as here above, connected to a management system 4 to receive subscriber management data elements or access checking data elements and technical management data elements or control data elements.

The access checking data elements relate to the authorization or prohibition of access by the subscriber to an encrypted program, the selection of the programs permitted to the subscriber by the transmission of the authorized channel numbers, etc. They are not directly exploited by the scrambler which only "integrates" them into the video signal to enable them to be conveyed to the decoder of the subscriber. Among these data elements, there are the cryptograms of the words for resetting the pseudo-random generators of the decoder of the subscriber which will be decoded by the subscriber if he is allowed to do so.

The control data elements directly relate to the working of the scrambler. They are the control data elements needed to set the parameters of the scrambling system proper, namely those needed by the electronic circuit of the scrambler 13 as explained here below.

A scrambler may be arbitrarily divided into two clearly distinct parts. These are, firstly, scrambling circuits working independently during an image and processing circuits generating the data elements needed by the scrambling circuits for the next image. These data elements are, for example, the parameters used to initialize the pseudo-random generators. The generation of certain of these data elements is done through information elements exchanged with the management system 4. Thus, for example, a mode switching request from the management system 4 is used by the processing circuits to make transmission, to the scrambling circuits, on the basis of a given image, of the scrambling commands corresponding to the mode.

The local scrambler 13 is connected to a CODec 12 not by its scrambled analog output but by a digital series output that enables the picking up of the digital signals, inter alia, from among those coming from the processing circuits. These data elements which are synchronized with the video signal received at input of the scrambler are sent at the image rate to an input of the reduced bit rate encoder CODec 12 called a service data channel. These signals relate to the access checking data elements as well as to the control data element. Indeed, the access checking data elements are, like the control data elements, transmitted to the scrambler circuits, but then they are transmitted not in order to be exploited but simply in order to be incorporated into the scrambled video signal. They are thus formatted in order to be conveyed to the decoder of the subscriber at the image rate, generally during the frame flyback. The CODec 12 receives simultaneously the audio analog signals coming from the audio source 6, and the video analog signals coming from the video source 2 and the digital control and access checking data elements coming from the local scrambler 13. The scrambled video output of this scrambler is not exploited and the scrambling circuits are not needed in this application. The transmission of the data elements exchanged between the processing circuits and the scrambler circuits towards the exterior of the scrambler, according to a given formatting method, requires, on the contrary, circuits specific to this use. The term "local scrambler" is thus quite arbitrary and the circuits are actually processing circuits that give signals needed for the working of the scrambling circuits.

The CODec carries out the encoding of the audio signal, the encoding and compression of the video signal and the multiplexing of these signals with the data elements that arrive on the service data channel.

The digital encoded signal thus available at output of the CODec, namely the video, audio and data signals, are transmitted on a low bit rate link connecting the production site 1 to the transmission site 7.

This link may be considered to be a sure one. The CODec circuits for example, which are of the 34 Mbit/s type, are generally provided with functions for the encryption of the data elements transmitted on the link, which is an encryption whose parameters can be set. The algorithms for the compression of the signal, the formatting of the data elements and the cryptography of the transmitted messages, intrinsic to the link, may be adapted to the level of security desired. Since these algorithms are not imposed, they may change in time.

The link is connected on the transmission site side to the input of a reduced bit rate decoder, coDEC 14, that carries out the operations in reverse to those performed by the CODec 12. The data elements received which have been encrypted for transmission on the low bit rate link are decrypted, the video signal is decompressed and decoded, and the access checking and control data elements are extracted from the received digital signal.

The audio and video signals restored by the coDEC are then applied to the input of a scrambler 15 which is called a shifted scrambler. The checking and service data elements available at a specific output of the coDEC called a service data channel are transmitted to the scrambler 15 by means of a digital series input corresponding to the digital output of the local scrambler 13. Here, the signals are given at input to enter the scrambler circuit. Circuits specific to this use are herein also necessary to take account of the series data elements and transmit them to the scrambler circuits according to the modalities of exchange of data needed between the standard scrambler circuits and the processing circuits. The data elements are recovered at the rate of the image and are used for the scrambling of the next image. These are the control data elements. The access checking data elements are also received at the image rate but simply in order to be transmitted at this rate with the scrambled video signal. Thus the shifted scrambler makes use not of the data elements of its processing circuits which are not necessary here but of those coming from the processing circuits of the local scrambler to scramble the video signals received and to transmit them to the antenna 9.

The error correction and detection circuits of the coDECs generally pertain solely to the video digital signals transmitted. The data elements transmitted by the service data channel are not concerned. Thus, while a transmission, even if noise-infested, usually has no effect on the audio and video signals received, it may give rise to a loss of information in terms of data elements transmitted on the channel. For this reason, a detection of error on the data elements is done at the shifted scrambler, the data blocks being sent with an error control encoding. Upon the detection of an error, the data elements received are discarded and those previously received are used. The shifted scrambler is thus also provided with storage circuits and processing circuits for the management of these data elements in the event of error. The stored data elements can be used to deduce the values of the parameters to be taken into account and to be discarded in order to provide for operation of the scrambler without any break, namely with the images transmitted to the subscriber being visible permanently.

What is claimed is:

1. A system for shifting a scrambler of a television signal coming from an audio and video source on a production site, the scrambled signal being transmitted to the subscriber from a transmission site different from the production site, wherein a local scrambler parameter determination mechanism on the production site receives the television signal to give digital data elements needed for the scrambling, but does not output a scrambled version of a video portion of said television signal, an encoder carries out a digital encoding of the television signal, said encoding depending on the signal entropy, the digital data elements and the encoded television signal are transmitted to the transmission site and a scrambler shifted to the transmission site scrambles the decompressed television signal on the basis of the digital data elements received by the transmission site.

2. A system according to claim 1, wherein the digital data elements are serialized and inserted, by multiplexing, into the digitized and compressed television signal, to be transmitted on one and the same link connecting the production site to the transmission site.

3. A system according to claim 2, wherein the link is a link by optical fiber, directional radio beam or cable, and wherein the digital data elements transmitted on the link are encrypted.

4. A system according to claim 1, wherein the digital data elements contain data elements including the scrambling mode, and the words for the resetting of the pseudo-random generators.

5. A system according to claim 1, wherein the digital data elements contain access checking data of the subscriber, including the cryptogram of the value for the resetting of the pseudo-random generators.

6. A shifting system according to claim 1, wherein the local scrambler parameter determination mechanism is formed by processing circuits and wherein the shifted scrambler is formed by scrambling circuits.

7. A system according to claim 1, wherein the shifted scrambler comprises circuits for the management and storage of the data elements received which use for their working the data elements prior to an error in the transmission of the digital data elements on the link between the production site and the transmission site.

8. A system comprising:
a production facility having,
    a television signal source including an audio source that produces an audio signal and a video source that produces a video signal,
    a local scrambler parameter determination mechanism configured to produce digital data elements that relate to scrambling the video signal, said local scrambler determination mechanism configured to output said digital data elements, but not output a scrambled version of said video signal, and
    an encoder configured to receive said television signal and digitally, enthropically encode said television signal to form an encoded television signal, where the encoding depends on a signal entropy of the television signal, said encoder configured to receive and combine said digital data elements with said encoded television signal and to provide an output signal,
a transmitter configured to transmit a scrambled television signal to a subscriber, having
    a decoder configured to receive said television signal and separate said digital data elements from said encoded television signal and decode said television signal, and
    a shifted scrambler configured to receive said digital data elements from said decoder and scramble said television signal with said digital data elements so as to provide said scrambled television signal; and
a communication link that conveys said output signal from the production facility to the transmitter.

9. The system of claim 8, wherein said encoder is configured to serialize and multiplex said digital data elements with said encoded television signal.

10. The system of claim 9, wherein:
said communication link comprises at least one of an optical fiber and a directional radio beam; and
said digital data elements being encrypted.

11. The system of claim 8, wherein said digital data elements contain data elements including a scrambling mode indicator and a pseudo-random generator reset word.

12. The system of claim 8, wherein said digital data elements contain access checking data of the subscriber and include a cryptogram of a value for resetting a pseudo-random generator.

13. The system of claim 8, wherein:
said local scrambler parameter determination mechanism comprises a processing circuit; and
said shifted scrambler comprises a scrambling circuit.

14. The system of claim 8, wherein:
the shifted scrambler comprises a circuit configured to manage and store a first subset of the digital data elements used by said shifted scrambler so that said first subset of the digital data elements are reused when a subsequent subset of the digital data elements are subject to corruption during transmission over said communication link.

* * * * *